United States Patent [19]

Brownscombe

[11] 3,815,975
[45] June 11, 1974

[54] MICROFICHE READER WITH FLOATING LENS
[75] Inventor: Philip J. Brownscombe, Millington, N.J.
[73] Assignee: Dietzgen Corporation, Chicago, Ill.
[22] Filed: Apr. 30, 1973
[21] Appl. No.: 355,589

[52] U.S. Cl.................. 350/255, 353/100, 350/245, 350/255
[51] Int. Cl. ............................................ G02b 7/02
[58] Field of Search ........... 353/108, 114, 115, 103, 353/100, 101; 350/241, 245, 247, 255

[56] References Cited
UNITED STATES PATENTS
2,052,261  8/1936  Verschoor .......................... 350/255
3,437,404  8/1969  Seedhouse .......................... 350/255
3,565,513  2/1971  Akiyama ............................. 350/255

Primary Examiner—Ronald L. Wibert
Assistant Examiner—Michael J. Tokar
Attorney, Agent, or Firm—Johnston, Keil, Thompson & Shurtleff

[57] ABSTRACT

A microfiche reader with a floating focusing lens having a shoe riding on the upper glass plate of a pair of glass plates holding a film therebetween. The focusing lens holder is suspended by two parallel, flexible beams and moves in response to changes in the plane of movement of the upper surface of the glass plate to maintain a constant distance between the film and the focal point of the focusing or projection lens.

6 Claims, 6 Drawing Figures

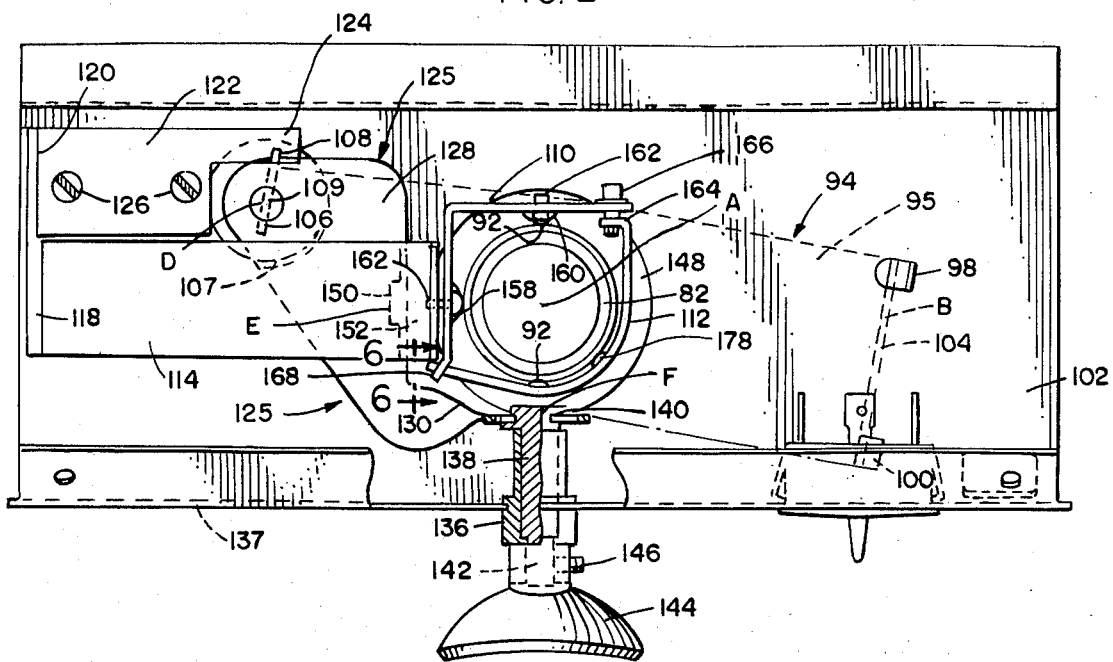
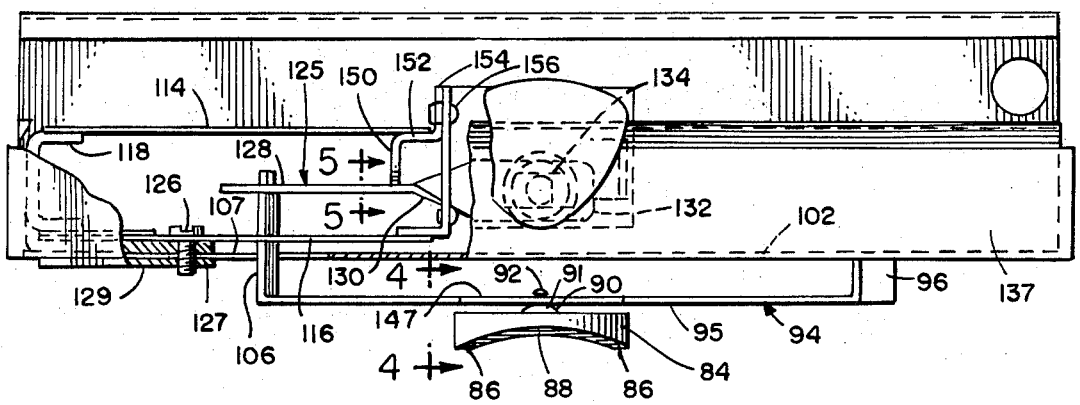
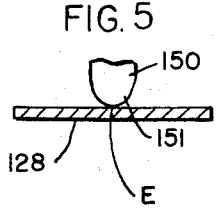
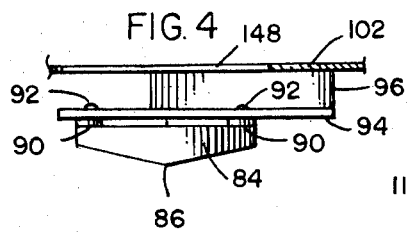
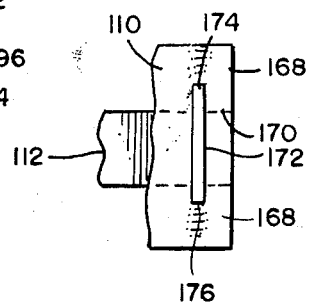

MICROFICHE READER WITH FLOATING LENS

INTRODUCTION

In mounting a projection or focusing lens in a projection device, a microfilm reader for example, it is necessary to have the lens optical axis truly perpendicular to the object (film) plane and to provide manual axial adjustment for focus. Frequently, this is accomplished by holding the cylindrical lens barrel within a tubular member. Adjustment may be made by engaging an eccentric pin in a groove in the lens barrel.

In a microfiche reader this construction requires that the portion of film being viewed must remain at the same level within one or two thousandths of an inch, sometimes less, as the fiche is scanned over its entire area. Otherwise frequent refocusing is required. This requirement demands precision in the scanning mechanism or some unusual construction.

One technique for maintaining a constant distance between the plane of the film being projected and the focusing or projection lens is the use of the "floating lens" principle. For example, in Peters U.S. Pat. No. 3,634,005, the lower end of the lens holding sleeve rides on the top glass plate of the fiche carrier. The lens holding sleeve is spring urged into contact with the upper surface of the top glass plate and utilizes ring means surrounding the lens holding sleeve to permit pivotal action at the nodal point of the lens. Such assembly requires precision machining and a flexible shaft connection between the focusing knob and the projection lens assembly.

The subject invention provides a combination which does not require precision parts, and yet, has no looseness or backlash in focusing. Furthermore, the focusing knob may be close to the lens. As an additional feature a fixed distance to the film intersection with the optical axis is maintained. This is not true in the usual floating lens in which the lens axis is fixed, because tilting of the fiche carrier causes a distance variation. Peters et al shows another method of maintaining a fixed distance relationship during slight tilting of the fiche carrier.

Briefly, the mounting of the objective or projection lens involves a lens barrel which is clamped to a holder having setscrew adjustments for adjusting the vertical axis of the objective lens. The holder is supported by two, parallel, horizontal, flexible beams fixedly attached at one end to a supporting member and at the other end to the holder. This structure forms a parallel motion device so that when the lens is moved up and down, it travels with its axis remaining parallel to the original position although displaced laterally by a small and insignificant amount, e.g., a few thousandths of an inch.

The support for the parallel flexible beams is secured to the base of the housing for the lens assembly by means of bolts and a clamp plate on the underside of the base. The bolts extend through oversized holes to permit some adjustment of the lens position so that it may be centered on the optical axis. The lens barrel is clamped in a right angle bracket, one side of which is supported by the parallel, flexible beams, and a strap. The lens barrel rests against two rivet heads at the bottom portion of the lens barrel and two setscrews at the top of the lens barrel. The strap, in turn, has one end held by a bolt and nut assembly. By loosening the strap, and adjusting the setscrews, the lens axis may be adjusted to make it perpendicular to the plane of the microfiche film. The setscrews are in the respective legs of the right angle bracket and are disposed at 90° relative to each other about the optical axis.

The floating lens assembly embodies two levers. A smooth, non-scratching shoe, e.g., made of nylon or other thermoplastic polymer, is loosely attached to the midportion of a lower lever. The shoe rides on the upper glass plate of the film holding plate assembly. This lever is pivotally supported at one end on the base of the housing and extends below its surface. The nylon shoe is a ring which is coaxial with a hole in the lever and immediately below and substantially coaxial with the objective or projection lens barrel. The opposite end of the lever moves up and down to an exaggerated degree as the upper surface of the glass plate moves out of its normal plane as the plate assembly is moved for projection of various frame images thereon. This vertical motion of the glass plate and the microfiche is normally at most only a few thousandths of an inch, but it is enough to disturb the image projected onto the screen of the reader by causing an unsharp or even blurred image as a result of change of focal distance between the film and the focal point of the objective or projection lens.

The other lever has a triangular portion extending horizontally between the parallel, flexible beams. A corner of the triangular portion rests upon a supporting edge of a vertical leg on the free end of the first lever. A vertical leg or bar below the upper flexible beam rests on the upper surface of the triangular portion of the second lever. One corner of the triangular portion has a 90° twist from which projects a vertical end segment having a longitudinal slot. The latter rests upon an eccentric disc portion of a lens focusing shaft. Upon rotation of the focusing shaft, the eccentric moves the slotted segment of the second lever up and down, which, in turn, produces a vertical movement of the objective or projection lens and its supporting assembly.

The second lever has three contact points, i.e., the supporting surface of the free end of the first lever at one corner of the triangular portion, the depending leg below the parallel, flexible, upper beam, and the eccentric. These points of contact are in a straight line and act as a mechanical differential to impart the sum of the motions at its ends to the lens mounting assembly at the point of contact of the depending vertical leg and the upper surface of the triangular portion of the second lever.

When the free end of the first lever rises and falls with variations in the plane of the upper surface of the upper glass plate (and the film flatly held between the two glass plates), the second lever pivots about its support on the eccentric, whereby the vertical leg contacting the upper surface of the triangular portion of the second lever lifts and drops the lens mounting assembly a fraction of the distance of vertical movement of the free end of the first lever and the corner portion of the triangle supported thereon. By correct proportioning of the pivotal points and the contact points of the respective levers, the objective lens will rise and fall the exact distance in which the plane of the upper surface of the upper glass plate rises or falls. Therefore, the distance between the objective or projection lens and the film between the glass plates remains constant, and focus is retained even with substantial change in the position of the film plane. The aforesaid proportioning is provided through making the ratio of the distance (1) between the eccentric and vertical leg point of contact on the triangular upper surface of the second lever to (2) the distance between the eccentric and the point of support of a second lever on the vertical leg of the first lever the same as the ratio of two distances from the optical axis of the objective or projection lens. The latter ratio is the ratio of (1) the distance between the optical axis to the pivot axis of the first lever and (2) the distance between the latter pivot axis and the point at which the vertical leg of the first lever contacts and supports the triangular corner portion of the second lever.

The glass plate-contacting shoe ring rests on the upper surface of the top glass plate at two diametrically opposite points formed by an arched configuration of the lower edge of the shoe ring and abuts the underside of the first lever at two other points 90° spaced about the optical axis from the two first-mentioned points. Therefore, tilting of the microfiche about the contact axis between the points of the shoes on the upper surface of the top glass plate does not change the distance from the lens to the glass along the optical axis. In practice, this tilting is at most very slight and is not enough to throw the image appreciably out of focus if the central distance is maintained.

Similarly, tilting of the glass plates about an axis 90° relative to the last-described tilting causes the shoe ring to rock slightly at the points where it contacts the under surface of the lower, first lever. Thereby, the axial distance from the lens to the film does not change appreciably.

The first, lower lever has a simple but effective hinge forming its pivots. Its pivotally supported end has two tabs which are inserted into two slots in the base plate of the lens housing, which tabs have 90° bends so that they overlie the top surface of the base plate adjacent the slots with the upper edge of the tab bearing legs in contact with the lower surface of the base plate and forming the pivot axis for the first lever at this line of contact.

The glass plate bearing, carriage assembly can be moved sufficiently forwardly to clear contact of the shoe ring with the upper glass plate. In this situation or in a situation where the glass plates are removed, the lower, first lever hangs by the tabs aforementioned and, at its free end, by an abutment tab limiting downward movement of the free end.

THE DRAWINGS

A preferred embodiment of the invention is illustrated in the drawings wherein:

FIG. 2 is a top plan view of the housing and objective lens support assembly in the housing;

FIG. 3 is a side elevation, partly in fragmented cross section, of the same housing and assembly;

FIG. 4 is a section view taken on section plane 4—4 of FIG. 3;

FIG. 5 is a section view taken on section plane 5—5 of FIG. 3; and

FIG. 6 is a fragmentary view taken from section plane 6—6 of FIG. 2.

THE ILLUSTRATED EMBODIMENT

Figure 1:
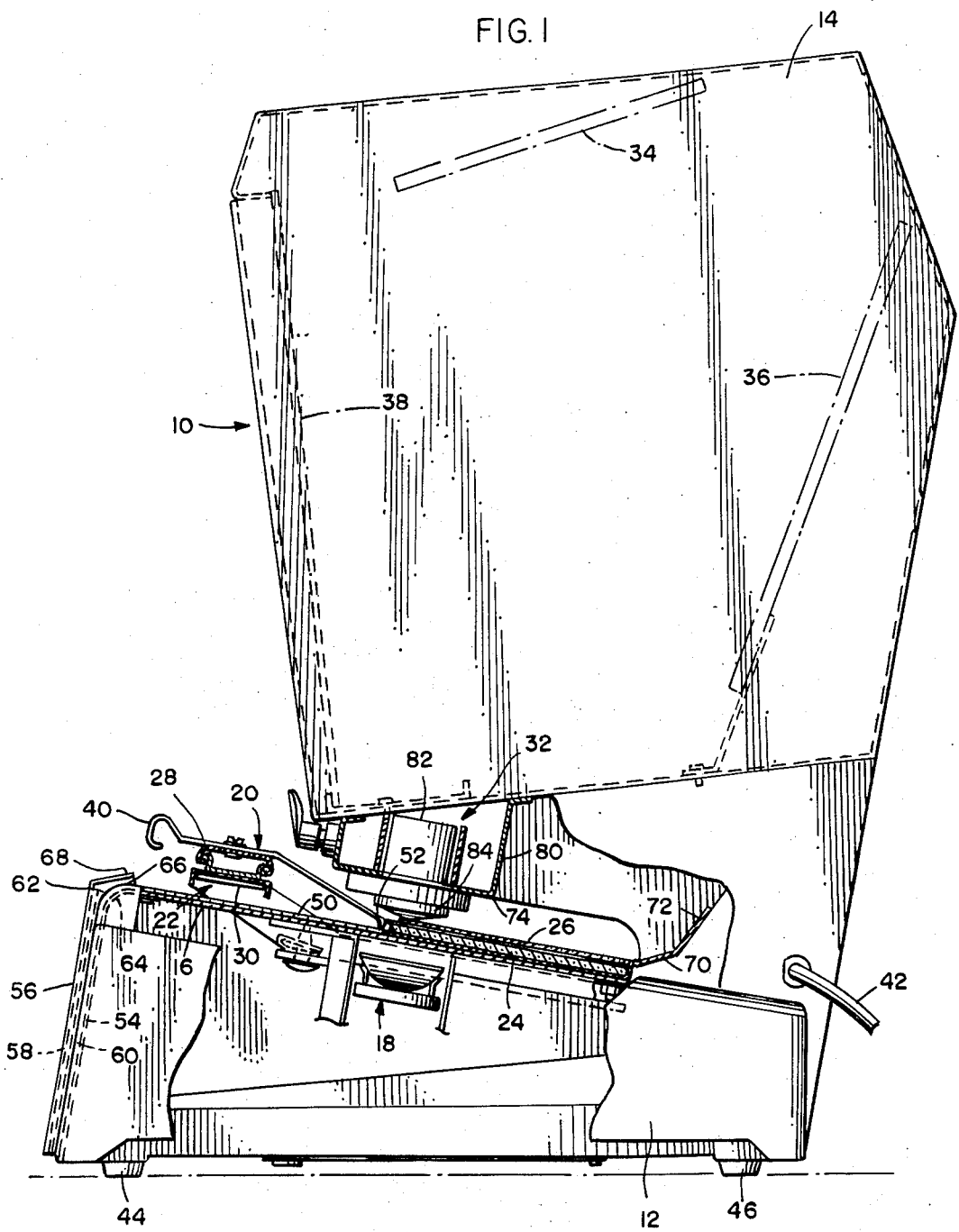
FIG. 1 is a side elevation, partly in fragmented cross section, of a microfiche reader.

Referring to the drawings, the microfiche reader 10 comprises a lower base housing 12 and an upper cabinet 14. The base 12 has an upper plate 16 on which is mounted the assembly 18 of a condenser lens for a lamp unit (not shown) of conventional construction.

The base has supported on its upper plate 16 an upper carriage assembly 20 and a lower carriage assembly 22. These carriages support and move a lower glass plate 24 and an upper glass plate 26, between which is flatly held the film such as a microfiche having a plurality of image frames arranged in horizontal rows and vertical columns. The upper carriage assembly 20 is mounted by a conventional ball slide 28 on a crossarm or bar 30 of the lower carriage assembly 22. The glass plates 24 and 26 are mounted in a conventional manner (not shown in detail) for movement from side to side with the upper carriage assembly 20 and from front to rear or rear to front by the lower carriage assembly 22. The details of these carriage assemblies do not constitute a part of this invention, but are illustrated and described in detail in my copending application, which is incorporated herein by reference.

The light projected through the condenser lens assembly passes through the glass plates 24 and 26 and the film held flatly therebetween. The image of the film is projected through the objective or projection lens 32 onto an upper mirror 34, which reflects the projected image onto the rear mirror 36. The image from the latter mirror is projected onto a translucent screen 38 extending across the front face of the cabinet 14. Thus, by grasping the handle-forming member 40 of the upper carriage assembly 20, an individual can move the carriage assemblies into any position for projecting and viewing a given frame or portion of the film held between the two glass plates 24 and 26.

Electric power for the lamp assembly is supplied through the electric cord 42. The base member 12 is a hollow base preferably having two front and two rear frusto-conical supporting feet 44, 46.

In a manner more clearly described and claimed in my copending application, the carriage assembly has a transversely flexible, longitudinally rigid strip 50 attached at its rearward end 52 to the carriage assembly. Its forward end extends into a space 54 in the front wall 56 of the base 12. The latter has a transparent, grid-divided panel 58 forming the front wall of the passage and a rear panel 60 forming the rear wall of the passage 54. The forward end of the strip 50 passes through the curved passage 62 formed by the convex corner 64 of the rear panel 60 and an opening 66 formed by wall 68 of the front panel. The strip 50 is coordinated with the grided panel 58 so that the lower central end of the flexible strip 50 indicates by row and column the frame of a microfiche which is in the projection path of the light projected through the lenses 18 and 32 and the microfiche holding glass plates 24 and 26. Further details of this flexible strip indicator means are described in my copending application.

Also in a manner more fully described in my copending application, the upper glass plate 26 is supported by a U-frame (not shown) having attached at its rearward, cross leg, an arm 70. The upper, rearward portion 72 of this arm will contact the lower corner 74 of the objective lens housing 80 and cause the upper plate to tilt or open when the carriage assembly is drawn to its forwardmost position.

The housing 80 serves principally as the housing for the objective or projection lens and its support assembly, which constitutes the invention claimed herein. The objective or projection lens or lenses are mounted in a lens barrel 82 which moves up and down in response to up and down movement of the shoe ring 84 resulting from changes in the plane of the upper surface of the glass plate 26 as the latter is moved by the aforesaid carriage assemblies.

The shoe ring 84 has diametrically opposed, substantially V-shaped points 86 which ride on the upper surface of the upper glass plate 26. These points are formed at the opposite ends of arched sections 88 in the lower edge of the ring. The upper side of the shoe ring 84 has at positions of 90° arcs relative to the points 86 a pair of upwardly projecting, round edge ears 90. The rounded edges 91 allow the shoe ring to rock about an axis displaced 90° to the axial line drawn through the points 86 by mounting the ears 90 loosely by pins 92 in a lower, first lever 94.

The lever 94 comprises a horizontal plate 95 having at one end a vertical segment 96. The latter has on its upper edge a pair of tabs 98,100 which are bent at right angles. The tabs 98,100 extend through slots (not shown) in the lower wall 102 of the housing 80. The ends of the tabs 98,100 rest on the upper surface of the lower wall 102 and the upper edge 104 of the vertical segment 96 rests against the under surface of the lower wall 102. The edge 104 functions as the pivot axis for the lower lever 94.

The free end of the lever 94 has an upwardly projecting, vertical leg 106 which extends through a circular opening 107 in the lower wall 102. This vertical leg has a lateral, side arm 108 which serves a function later described. The vertical leg 106 has a vertical tab 109 serving a function also later described.

The lens barrel 82 is mounted in a mounting assembly which embodies an L-bracket 110. It is held in the L-bracket by a band 112, the details of which are later described.

The aforedescribed parallel beam support for the objective or projection lens assembly comprises an upper horizontal, thin, flexible metal strip 114 and a like, parallel, lower strip 116. One end of the strips 114 and 116 is rigidly affixed to the side legs of the U-bracket 118. The U-bracket 118 has a lateral arm 120 disposed in the vertical plane. This vertical arm has integrally formed therewith a horizontal arm 122 having a horizontal extension 124 of narrower width. The latter extends over the aperture 107.

The unitary piece comprising the U-bracket 118, the lateral arm 120 and the horizontal arm 122 are mounted on the lower wall 102 by screws or bolts 126 threaded into a lower clamp plate 129. The bolt receiving holes 127 in the lower wall 102 are larger than the bolt shaft so that the entire lens supporting assembly can be shifted to align the lens barrel 82 along the true optical axis. Once so positioned, the screws or bolts 126 and clamp plate 129 hold the lens assembly in fixed position relative to the optical axis.

The second lever 125 comprises a horizontal, generally triangular, upper plate 128 and a lateral leg 132 lying in a substantially vertical plane and connected with the substantially triangular plate 128 by a segment 130 providing a 90° twist.

The leg 132 has a horizontal slot 134. The front wall 137 of the housing 80 has fixedly mounted therein a hub 136 which rotatably journals a shaft 138 having at one end thereof an eccentric cylindrical segment 140. The upper edge of the slot 134 rides on the top wall of the eccentric member 140. Thus, when shaft 138 is turned, the leg 132 is moved up and down to provide focal adjustment. Such focal adjustment is made manually by providing an extension 142 of the shaft 138 and the mounting on this extension of a knob 144 by a setscrew 146.

The horizontal plate 95 has a circular opening 147 coaxial with and of substantially the same diameter as the shoe ring 84. The lower wall 102 has a circular opening 148 larger than but coaxial with the circular opening 147. These openings allow unobstructed passage of light from the light source (not shown) through the condenser lens 18, the glass plates 24 and 26 and the objective or projection lens 32.

The L-bracket 110 is supported by a vertical tab 150 having a rounded lower edge 151 (FIG. 5). The tab 150 is a part of a bar having a horizontal leg 152 to which the upper, flexible beam or strip 114 is fixedly attached and a vertical leg 154. The latter is attached to the L-bracket in any suitable manner. A setscrew 156 is threaded in the leg 154 and in one leg of the L-bracket 110. Another setscrew 162 is threaded in the upper portion of the other leg of the L-bracket 110. The respective lower portions of the legs of the L-bracket have rivet heads 158 and 160.

When the lens barrel 82 is clamped in position in the L-bracket 110 by the clamping band 112, its lower portion is drawn tight against the heads of the rivets 158 and 160, the axes of which are at right angles to each other and intersect at the approximate optical axis for the lens barrel. The upper portions of the lens barrel bear against the respective setscrews 156 and 162 which are respectively directly above the rivet heads. The axes of these setscrews are at right angles to each other and also intersect at approximately the optical axis.

One end of the clamping band 112 has a right angle bend 164. A screw or bolt and nut connector 116 extends through apertures in one leg of the L-bracket 110 and the bent end 164. This screw or bolt and nut connector is used to loosen or tighten the clamping band about the lens barrel.

The other leg of the L-bracket 110 has a terminal angular bend 168 provided with a notch 170. The end 172 of the clamping strap has lateral ears 174 and 176, whereby the end 172 of the clamping strap extends through and is held at the notch 170. Preferably, the clamping band has at least one round head 178, e.g., the head of a rivet, forming the point or points of contact between the band and the lens barrel. In the illustrated embodiment (FIG. 2), the round head 178 is equally spaced from the round heads 158, 160 and setscrews 156, 162, i.e., at respective arcs of 135°.

In order to raise and lower the lens mounting assembly via the leg 150 the same distance at which the plane of the film (and the upper surface of the top glass plate) change, the levers 94 and 125 have the following features. The center of the point of contact D of the vertical leg 106 with the apertured corner of the plate 128 of the upper lever 125, the point of contact E of the leg 150 on the triangular plate 128 and the point of contact F between the eccentric member 140 and the top edge of the slot 134 are in a straight line. Further, the ratios of the distance between points E and F and points D and F are equal to the ratio of the shortest distance between the line forming the hinge axis B to the optical axis A of the objective or projection lens and the shortest line distance between the hinge axis B and the aforedescribed point D.

Thus, the objective lens is moved up and down under two different circumstances. When the knob 144 is rotated, the eccentric causes the upper lever 125 to rise or fall about the pivot formed by the point D, thereby imparting vertical movement to the lens mounting bracket via the contact of leg 150 with the triangular section 128 of the upper lever. On the other hand, when the shoe ring 84 rises or falls due to change in the plane of the upper surface of the upper glass plate 26, the lower lever 94 causes the point of contact D to rise or fall, whereby the upper lever 125 will pivot about the point F and transmit vertical motion to the lens barrel holding assembly via the leg 150.

The invention thus provides a floating lens assembly for projecting an image from a film or transparency lying flatly beneath a transparent plate movable by carriage means in a substantially constant plane. The assembly comprises a projection lens member in a lens support member suspended above the transparent plate by mounting means including a pair of upper and lower, flexible, horizontal, parallel, thin metal strips forming a pair of parallel motion, cantilever support beams connected to said support member. The optical axis of the lens is substantially at a right angle to said plane. A follower member is adapted to rest slidably on the upper surface of said glass plate below the lens member. Lever means operatively connects the follower member and support member for movement of said lens member substantially parallel to its optical axis by the same amount as changes in the plane of the upper surface as said glass plate is moved in a plane at right angles to said optical axis, thus maintaining a substantially constant focal distance between the lens member and the film or transparency, e.g., a microfiche with a plurality of image frames.

The lever means includes a first lever having its pivot axis at one end with the follower member being mounted on an intermediate portion thereof. The free end of the first lever has a second lever support means thereon. The unit further has a lens-focusing member with eccentric means thereon. The second lever is supported at one end on said eccentric means and at the other end thereof on said lever support means. A contact member attached to said lens support member contacts the second lever at an intermediate position thereon.

Preferably, the lens assembly is in a housing having a lower wall. The first lever depends at its pivot axis from said lower wall and extends beneath said wall. The follower member preferably is a ring coaxial to the optical axis of said lens member. Apertures in the first lever and said lower wall are also coaxial about said optical axis.

The ring has a lower, glass-contacting surface provided by diametrically opposite, substantially pointed segments. There further is means pivotally mounting said ring on said first lever at diametrically opposite positions displaced 90° relative to said substantially pointed segments.

The second lever may be within said housing. One end of the second lever is supported on a vertical member on the free end of the first lever, said vertical member extending through an aperture in said lower wall. The focal adjustment utilizes a rotatable eccentric means on a rotatable shaft mounted in a vertical wall of said housing. The opposite end of the second lever is mounted on said rotatable eccentric means. A member rigidly associated with said lens member and supported on an intermediate part of said second lever transmits plane changes of the upper glass plate and manual focal adjustment to the objective or projection lens.

It is thought that the invention and its numerous attendant advantages will be fully understood from the foregoing description, and it is obvious that numerous changes may be made in the form, construction and arrangement of the several parts without departing from the spirit or scope of the invention, or sacrificing any of its attendant advantages, the form herein disclosed being a preferred embodiment for the purpose of illustrating the invention.

The invention is hereby claimed as follows:

1. A floating lens assembly for projecting an image from a film or transparency lying flatly beneath a transparent plate movable by carriage means in a substantially constant plane, said assembly comprising a projection lens member having an optical axis substantially at a right angle to said plane, and held in a lens support member suspended above said plate by mounting means including a pair of upper and lower, flexible, parallel, thin metal strips at right angles to said optical axis and forming a pair of parallel motion, cantilever support beams connected to said support member, a follower member adapted to rest slidably on the upper surface of said glass plate below said lens member, lever means operatively connecting said follower member and support member for movement of said lens member substantially parallel to its optical axis by the same amount as changes in the plane of said upper surface as said glass plate is moved in a plane at right angles to said optical axis to maintain a substantially constant focal distance between said lens member and said film or transparency.

2. A lens assembly as claimed in claim 1, said lever means including a first lever having its pivot axis at one end, said follower member being mounted on an intermediate portion thereof, and the free end of said lever having second lever support means thereon, a focusing member having eccentric focal adjustment means thereon, and a second lever supported at one end on said eccentric means and at the other end thereof on said lever support means, and a contact member attached to said support member and contacting said second lever at an intermediate position thereon.

3. A lens assembly as claimed in claim 2, a housing for said assembly, said housing having a lower wall, said first lever depending at its pivot axis from said lower wall and extending beneath said wall, said follower member being a ring depending from said first wall coaxial to the optical axis of said lens member, and apertures in said first lever and said lower wall also coaxial to said optical axis.

4. A lens assembly as claimed in claim 3, said ring having a lower, glass-contacting surface provided by diametrically opposite, substantially pointed segments.

5. A lens assembly as claimed in claim 4, and means pivotally mounting said ring on said first lever at diametrically opposite positions displaced 90° relative to said substantially pointed segments.

6. A lens assembly as claimed in claim 3, said second lever being in said housing, one end of said second lever being supported on a vertical member on the free end of said first lever, said vertical member extending through an aperture in said lower wall, rotatable eccentric means on a rotatable shaft mounted in a vertical wall of said housing, the opposite end of said second lever being mounted on said rotatable eccentric means, and a member rigidly associated with said lens member and supported on an intermediate part of said second lever.

* * * * *